United States Patent [19]

Capowski et al.

[11] 4,126,897
[45] Nov. 21, 1978

[54] REQUEST FORWARDING SYSTEM

[75] Inventors: Robert S. Capowski, Verbank; Matthew A. Krygowski, Wappingers Falls; Terrence K. Zimmerman, Red Hook, all of N.Y.

[73] Assignee: International Business Machines Corporation, Armonk, N.Y.

[21] Appl. No.: 813,404

[22] Filed: Jul. 5, 1977

[51] Int. Cl.² .......................... G06F 3/00; G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,488,633 | 1/1970 | King | 364/200 |
| 3,550,133 | 12/1970 | King | 364/200 |
| 3,599,186 | 8/1971 | May | 364/200 |

*Primary Examiner*—James D. Thomas
*Attorney, Agent, or Firm*—Robert Lieber

[57] ABSTRACT

Storage access requests are forwarded from plural input/output channels to shared main storage. An address word in each request designates the identity of the source channel (CHID) and "destination" address (of a doubleword space in storage relative to which one, two or four "data" words shall be transferred). EOT tag signal provides demarcation of requests and also uniquely identifies "1-wide" input (Store) requests. Quadword (QW) tag, presented with "4-wide" requests, enables the storage access system to use a single address in the request to locate two contiguous doubleword spaces in storage. Data tags (D1, D2), presented on a selective basis enable the access system to selectively steer (reorder the positions of) data words in an input request relative to word halves of the addressed space. Consequently the data repositioning function associated with Read Backward operations does not require reordering of data words in the channel buffers (saving handling time and expense of "steering" circuits in the individual channels). In association with a "1-wide" input request a single data tag, D1 or D2, is used to steer the single data word of the request into either half of the addressed space on a selective basis.

14 Claims, 15 Drawing Figures

FIG.7 READ
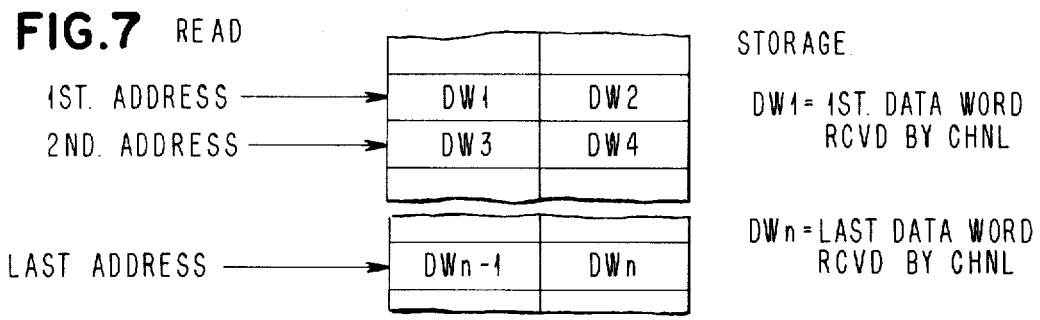
STORAGE
DW1 = 1ST. DATA WORD RCVD BY CHNL
DWn = LAST DATA WORD RCVD BY CHNL
FIG.8 READ BKWD
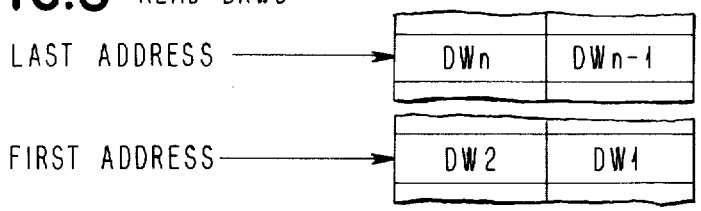
FIG.9 PRIOR ART READ BKWD (QW)
| CHANNEL INPUT | CHANNEL OUTPUT | |
|---|---|---|
| DW1 | DW2 | 1ST. ADDRESS WORD 0 |
| DW2 | DW1 | 1ST. ADDRESS WORD 1 |
| DW3 | DW4 | 2ND. ADDRESS WORD 0 |
| DW4 | DW3 | 2ND. ADDRESS WORD 1 |
| DW5 | DW6 | 3RD. ADDRESS WORD 0 |
| DW6 | DW5 | 3RD. ADDRESS WORD 1 |
| DW7 | DW8 | 4TH. ADDRESS WORD 0 |
| DW8 | DW7 | 4TH. ADDRESS WORD 1 |
FIG.15
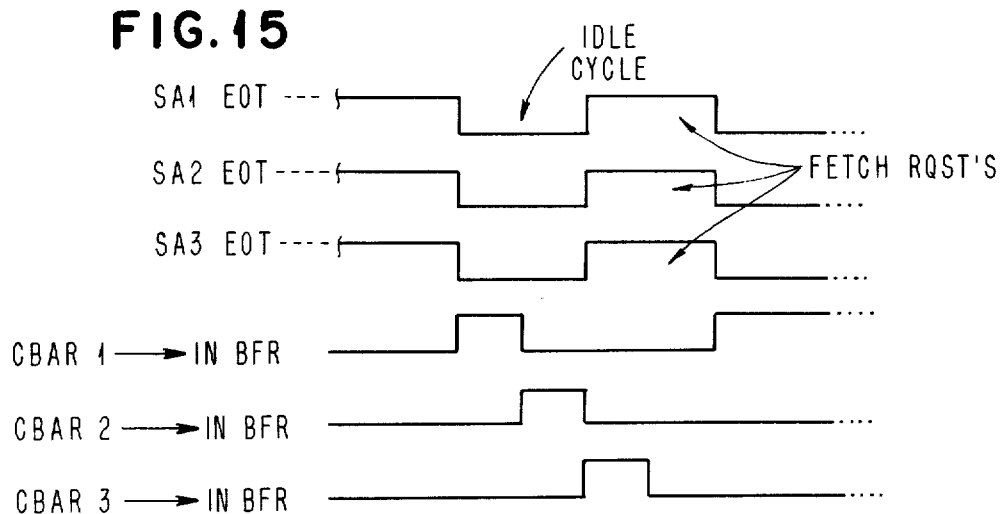

FIG. 12 (CA RQ FWD'G LOGIC)

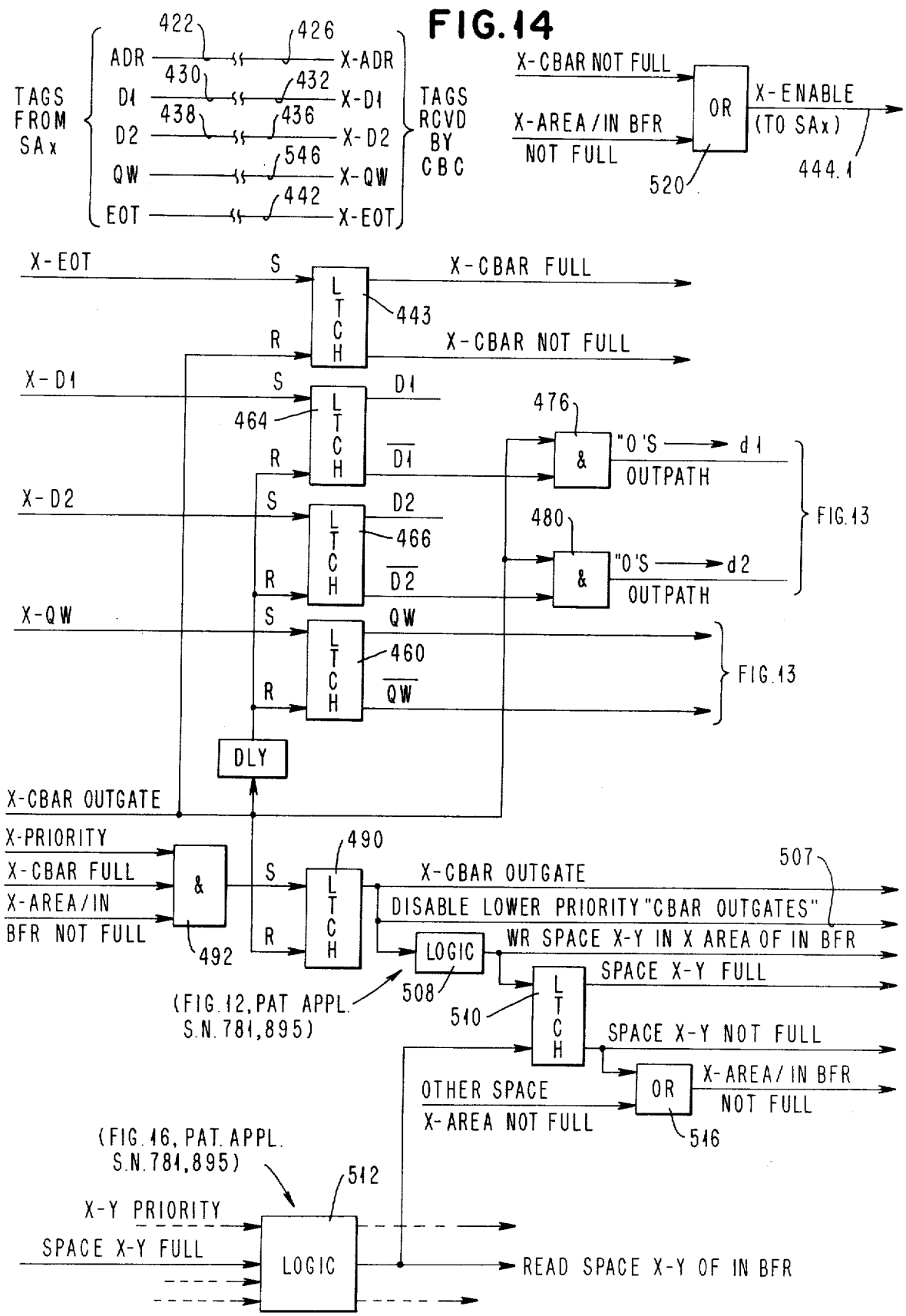

4,126,897

REQUEST FORWARDING SYSTEM

REFERENCES TO RELATED PATENTS AND PATENT APPLICATIONS

U.S. Patent application Ser. No. 781,895 by R. S. Capowski et al., filed Mar. 28, 1977 entitled "Channel Bus Controller", contains a description of storage access controls employed in the subject request forwarding system.

U.S. Patent application Ser. No. 813,408, filed July 5, 1977, by M. Krygowski entitled "Channel Storage Adapter", filed simultaneously herewith, contains a description of a storage adapter employed in the subject request forwarding system.

BACKGROUND OF THE INVENTION

1. Field of the Invention

This invention relates to systems for transferring storage access requests from plural input/output channels to shared main storage.

2. Prior Art

Use of tag signals for data word demarcation, in a request forwarding system between input/output channels and shared storage access equipment, is not original. However the presently described use of data word demarcation tags to obtain reversible orientation in storage of pairs of data words — in association with Read and Read Backward operations in associated channels — is considered to be original and innovative.

Known request forwarding systems, as characterized above, require express transfer of a storage address with each storage access request. The present system offers potential signaling speed advantage by activating a special (QW) tag line to designate implied addresses in a series of request transfers from one source relative to a series of contiguous data storage spaces. Upon receiving a single explicit address designating an initial location, and a series of tag activations on the implied address tag line, the storage access equipment develops a series of addresses for location of said contiguous spaces.

Known request forwarding systems as characterized above employ bilateral (fully interlocked) control signaling between channel adapters and shared storage access equipment. Each adapter must present a signal soliciting access to said equipment and receive an acknowledgment signal from said equipment before it can transfer the signals which represent a request. The present system differs in the use of unilateral control signaling which is generally more efficient.

In unilateral control signaling the shared equipment controls an enabling line relative to each adapter to present an enabling signal which may be active continuously for long intervals of time. The state of each enabling signal is dependent only on conditions of vacancy in a buffer queue which stores the requests en route to storage. When the queue capacity allotted to each adapter is not completely occupied the enabling signal to that adapter is held active (or changed to active if previously inactive).

When an adapter has a request to forward it may immediately begin to transfer request signals if the associated enabling line is active and if a predetermined delay time has elapsed since the completion of its last previous request transfer. The above-mentioned queue comprises an entry register (CBAR) associated with each adapter for receiving the request signals from the interface bus lines and a shared buffer array (In Buffer) providing intermediate buffering of requests between each of the entry registers and storage. The above-mentioned delay time is related to the aggregate (worst case) time required to empty all of the entry registers into the In Buffer array when said entry registers have been loaded simultaneously.

SUMMARY OF THE INVENTION

Present data tag usage is considered unique and advantageous in an unusual sense inasmuch as it permits input/output channels and subject (channel group) adapters to provide identical handling of data words and storage addresses for both Read and Read Backward type input operations. It also permits each adapter to defer its distinction of the type of operation (and the associated decision for selection of the data tag signal to be presented) to a latest possible point in time in its request forwarding sequence of operations. Consequently, the control of the request forwarding sequence may be relatively simplified. It also off-loads the responsibility for positioning data, within the storage space designated by the request address, to the access equipment shared by all adapters; with consequent economies of hardware usage and timing.

Further novelty is contemplated in present treatment of 4-wide (in general $2n$-wide) requests as two (in general $n$) 2-wide requests and use of associated tag signals (QW) to eliminate double (in general multiple) transmissions of address intelligence in the forwarding of 4-wide (in general $2n$-wide) requests. The storage access system uses a single expressly transmitted address to locate two (in general $n$) contiguous doubleword spaces representing the source or destination of the request data. In the 4-wide case one space is located by use of the transferred (explicit) address and the other contiguous space is located by the use of an implicit address formed by inversion of a low order bit in the explicit address.

Another novel aspect of the invention is in the use of unilateral interlocking, as characterized above, to achieve faster handling of request transfers.

The foregoing and other aspects, features, objectives and advantages of the present invention may be more fully appreciated and understood by considering the following detailed description in conjunction with the accompanying drawings and claims.

DESCRIPTION OF THE DRAWINGS

FIG. 5 also illustrates the format of data words which accompany input requests;

FIGS. 7 and 8 illustrate conventional (prior art) use of storage in association respectively with Read and Read Backward channel operations;

FIG. 9 illustrates prior art request forwarding operations in association with Read Backward operations in prior art channels;

FIGS. 13 and 14 illustrate logic in the channel bus controller for carrying out the operations characterized in FIG. 11; and FIG. 15 illustrates a particular aspect of the relative timing of first and second adapter operations for explaining the unilateral control aspect of the subject invention.

DETAILED DESCRIPTION

Introduction

Figure 1:
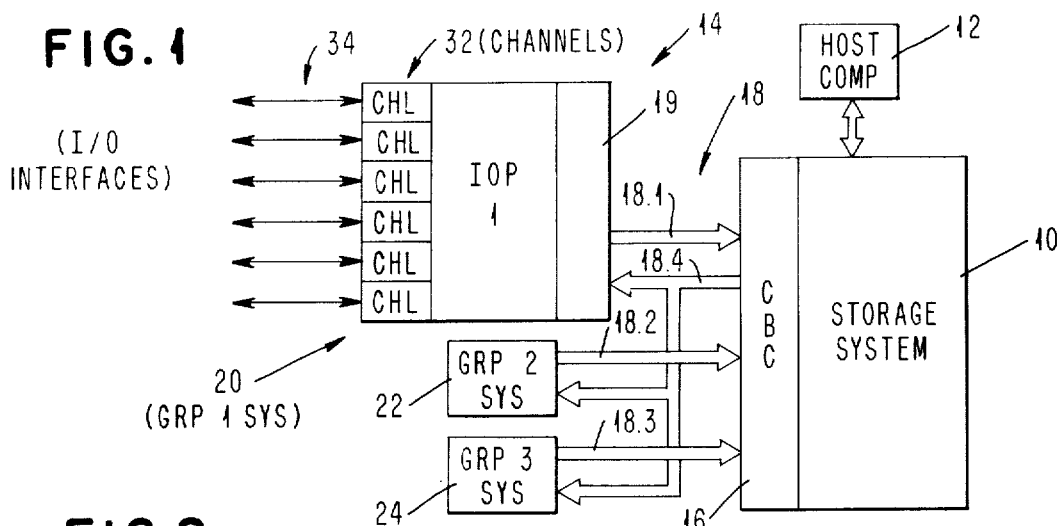
FIG. 1 schematically illustrates the system environment in which the subject request forwarding system is intended to operate.
Figure 2:
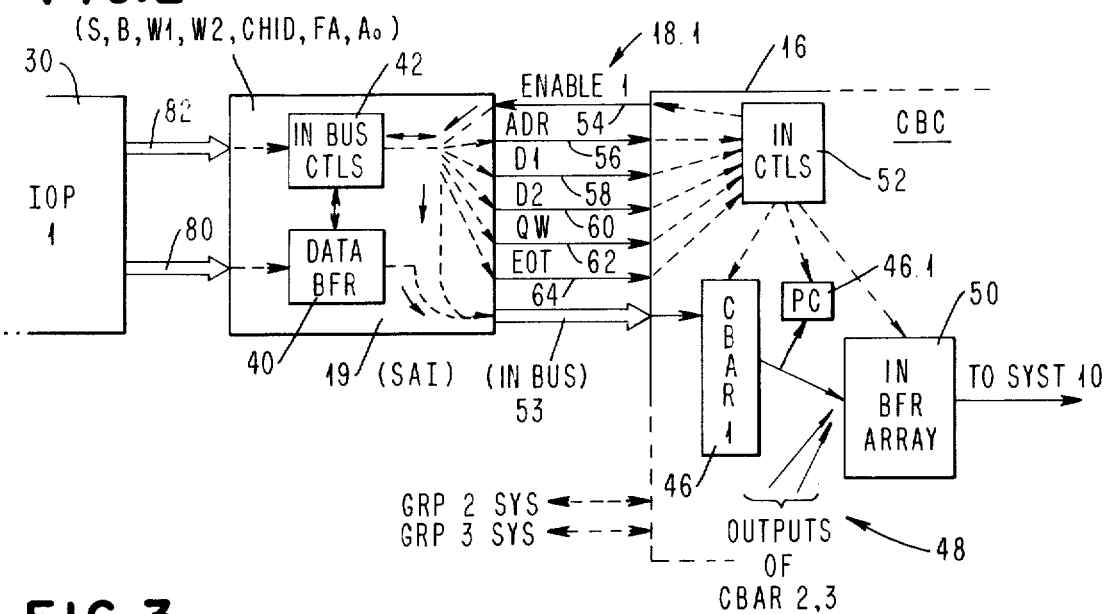
FIG. 2 schematically illustrates first adapter (storage adapter) and second adapter (channel bus controller) elements of the subject invention, and their request exchange interconnections.

A system embodying the subject invention is illustrated in FIGS. 1 and 2. Details of individual component blocks of the system, other than the storage adapter and channel bus controller units, are not relevant to an understanding of the present invention. However a general description of the operation of the entire system is given here to facilitate an understanding of the environment of operation of this invention.

Shared main storage system 10 serves host computer 12 and a plurality of input/output group processing systems indicated generally at 14. Storage facility 10 comprises a plurality of storage modules and storage access controls which control priority of access to the modules and selection of specific address locations (storage spaces) within modules. The system linking the storage system 10 and the input/output processing systems 14 comprises a channel bus controller adapter unit indicated at 16, specific configurations of busing lines indicated generally at 18 and channel group adapter units, exemplified by the adapter SA1 (Storage Adapter) shown at 19, associated with individual ones of the input/output group processing systems 14.

The system contemplated in FIG. 1 comprises up to three input/output group processing systems 20, 22 and 24, each serving a respective group of up to six input/output channels. The system serving Channel Group 1 is indicated at 20, the system serving Channel Group 2 is indicated at 22 and the system serving Channel Group 3 is indicated at 24. The systems 20, 22 and 24 are essentially identical in internal construction. Consequently details of only the (Group 1) system 20 will be explained here (and details of the other systems should be inferred from this explanation).

System 20 comprises "first" (channel group) adapter 19 (also known as Storage Adapter SA1), input/output processor 30 (IOP1) and six input/output channels shown collectively at 32. The six channels have six respective I/O interfaces 34, which are connected via I/O controllers (not shown) to peripheral devices or via channel-to-channel adapter units to peripheral computers (also not shown).

Adapter 19 and IOP 30 (also known as "director") are described in the above-referenced patent application entitled "Channel Storage Adapter" by M. Krygowski; the disclosure of said application being incorporated herein by this reference. The channel bus controller 16 is described in the above-referenced co-pending patent application, Ser. No. 781,895 by Capowski et al entitled "Channel Bus Controller"; the disclosure of which is also incorporated herein by this reference.

In general it will be understood that host computer 12 initiates operations of the individual channels such as 32 via a (not shown) signalling link to the associated input/output processor 30. Thereafter the channels 32 operate independently to link associated peripherals with main storage system 10 via associated group input/output processing system 20, group adapter 19, group adapting interconnections 18.1 and the channel bus controller (CBC) 16. In the process of communication between channels and storage the channels furnish input (storage) and output (retrieval) requests (comprising address intelligence designating locations of data storage spaces) and the storage system 10 returns responses (representing either data retrieved in response to output requests or status of processing of input requests). Requests and responses are queued in buffer storage arrays resident in units 30, 19 and 16; and transferred between units in an asynchronous mode. Transferred information is parity checked in unit 16.

The response to an input request typically includes information indicating whether the data has been received in correct (parity-checked) form. The response to a fetch (output) request typically includes data which has been retrieved from a storage space designated by the request address.

The request forwarding interconnection lines 18.1 are associated with Group 1 system 30. Similar interconnections 18.2 and 18.3 are associated respectively with Group 2 system 22 and Group 3 system 24.

The response busing interconnections 18.4 comprise a multidrop bus having drops or ports linked to adapter units such as 19 in each of the systems 20, 22 and 24. These interconnections include not-shown individual "advance" lines linked to each adapter unit for directing each response to the appropriate unit.

The present invention is concerned particularly with the request forwarding interconnections 18.1–18.3 and associated parts of respective group adapter units (such as 19) and the shared CBC unit.

Storage Adapter (General)

FIG. 2 shows that adapter 19 (SA1) comprises a "data buffer" array 40 and associated controls 42. These component units are described in detail in the above-referenced patent application by Krygowski entitled "Channel Storage Adapter". Parts of these component units relevant to the forwarding of requests will be described in the following discussion.

Channel Bus Controller (General)

FIG. 2 shows that channel bus controller 16 (CBC) comprises a separate channel bus assembly register (hereinafter CBAR) associated with each group storage adapter for receiving request signals transferred over lines in the associated interconnections (18.1, 18.2 or 18.3, FIG. 1). The CBAR register 46 (CBAR 1) associated with SA1 (adapter 19) is expressly illustrated. Other CBAR's (CBAR 2, CBAR 3) are suggested implicity at 48 but not illustrated explicitly. The CBC also comprises an "In Buffer" array illustrated at 50 and associated request queueing controls 52. Array 50 receives and queues requests from all of the CBAR registers. Specific register spaces within array 50 are "permanently" dedicated to traffic of respective CBAR's. Transfers into array 50 are subject to a predetermined priority order (traffic in register CBAR 1 takes precedence over traffic in CBAR 2 which in turn takes precedence over traffic in CBAR 3). In Buffer array 50 forwards requests to storage system 10, when that system is available, subject to the same order of priority. CBAR outputs are parity checked by associated parity check circuits such as circuit 46.1.

Request Forwarding Interface

Interconnections 18.1, shown in FIG. 2, comprise a 41-line bus 53 designated "In Bus" and six control lines. Bus 53 is used to transfer address word and data word intelligence of requests in word signal units of 41 bits.

Enable control line 54 is activated (raised) by the request forwarding controls 52 of the CBC, to enable adapter 19 (hereafter SA1) to forward a request to the CBC when it has a request to send. Line 54 is held active to provide "unilaterally interlocked" control of SA1, when a vacancy exists within the buffer capacity of either CBAR 1 or array 50 (within the portion of that array devoted to Group 1 requests).

The other five control lines of interconnections 18.1 — lines 56, 58, 60, 62 and 64 — are controlled by controls 42 of SA1. These other lines comprise address tag line (ADR) 56, two data tag lines 58 (D1) and 60 (D2), quadword tag line 62 (QW) and end of transmission tag line 64 (EOT). Address tag ADR is activated to indicate the presence of request address word signals on In Bus 53. The data tags, D1 and D2, are activated selectively to indicate the presence of input data word signals on In Bus 53 and to designate destinations of associated data words relative to pairs of word storage spaces designated by an associated address word. QW tag line 62 is activated to represent implicit address transfer in association with transfers of 4-wide requests. EOT is activated to demarcate 1-wide and 2-wide requests, and halves of 4-wide requests.

Figure 4:
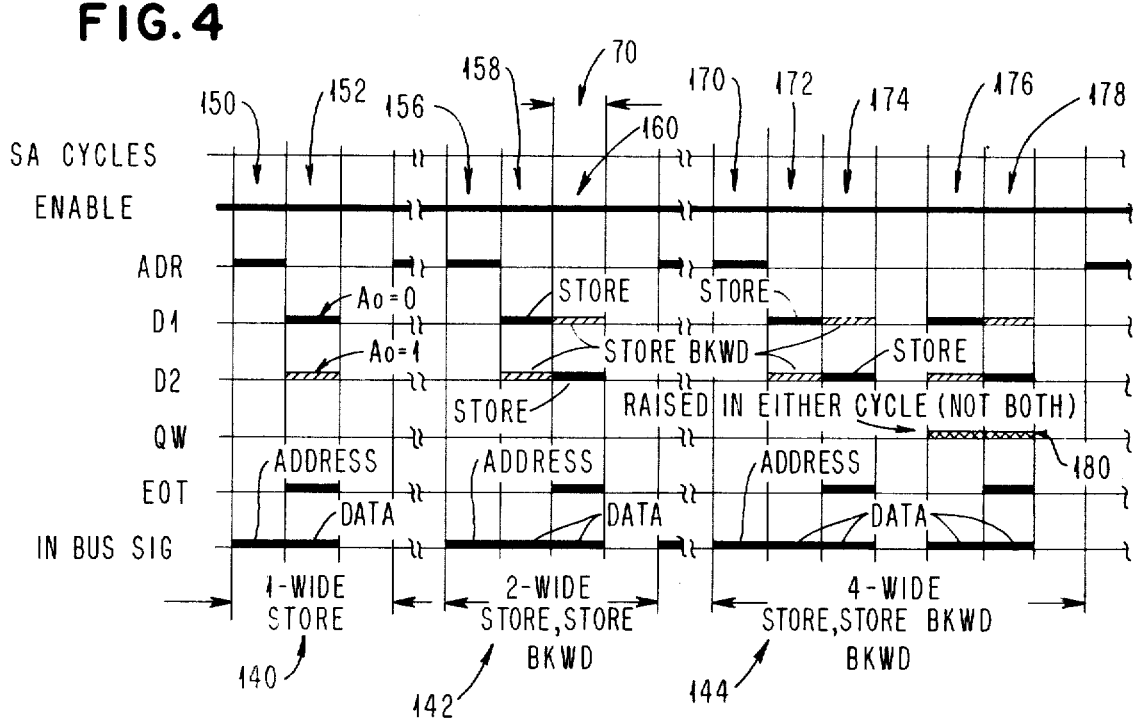
Figure 5:
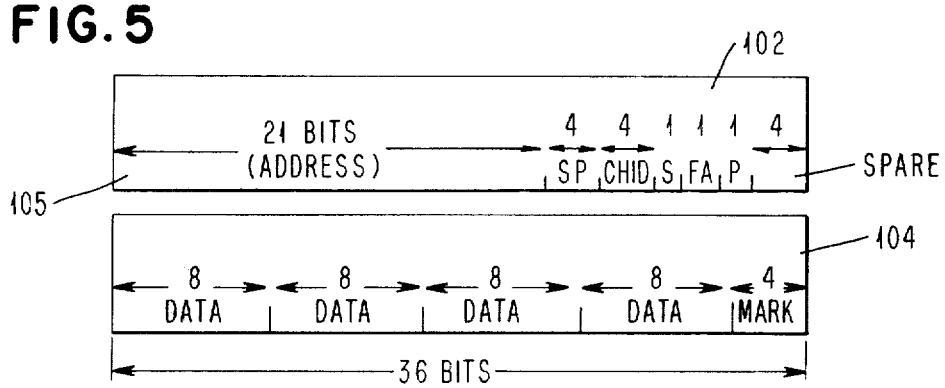
FIG. 5 schematically illustrates the bit format of a request address word constituting either the whole of an output (Fetch) request or part of an input request.

In Bus 53 is operated cyclically to transfer address and data word units of request intelligence in the bit parallel form shown in FIG. 5. The timing and cycle formats of transfer sequences associated with Fetch and Store requests are indicated in FIGS. 3 and 4.

Figure 3:
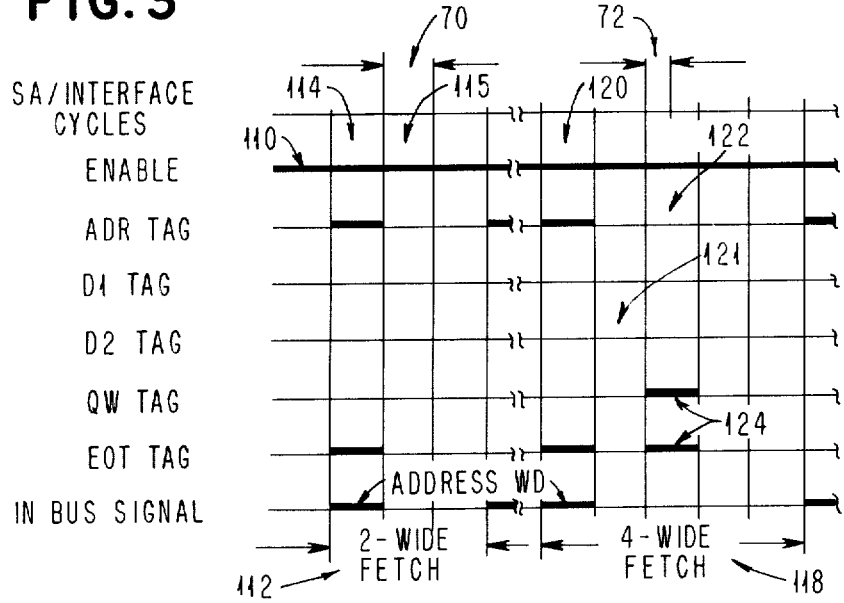
FIGS. 3 and 4 indicate the format and cycle timing of input request and output request transfers relative to interconnection lines shown in FIG. 2.

FIGS. 3 and 4 indicate the typical cycle time 70 of request transfer signaling operations, which also represents the time of an operating cycle of IOP system 30 and SA1. An internal operating cycle of CBC unit 16 suggested at 72 has a duration approximately half that of the indicated cycle 70. The durations of cycles 70 and 72 are approximately 120 and 60 nanoseconds respectively. Consequently the CBC is capable of executing two cycles of internal operation for each cycle of potential signalling action on interconnections 18.1.

CBAR registers such as 46 (FIG. 2) are not reset after their contents are transferred to array 50. Associated with each CBAR is a full/not full latch, shown and discussed later in this description (in reference to FIG. 14), which is set to full (to indicate occupancy) when EOT tag is received and not full (to indicate vacancy) when request information is passed from the CBAR to In Buffer array 50.

Request Forwarding Operation (General)

Requests are handled as follows. Request information — originated by any channel 32 (FIG. 1) or by IOP system 30 (relative to an internal computing process being executed by that system) — is passed on to SA1 and queued in data buffer 40 and controls 42. Address and data intelligence of the request is passed to buffer 40 (FIG. 2) via busing lines shown at 80 (FIG. 2). Control information associated with the request is passed, via lines 82 (FIG. 2), to a control sequence buffer included in the "In Bus controls" 42 (FIG. 2). The control information is thereby queued in association with the respective request. The control information includes: 3 bits termed CHID (channel identity) which designate the request source (channel or internal IOP process), bit S designating the request type (Store/Fetch); bit B distinguishing directionality (backward/not backward) of input requests (associated with Read Backward and Read operations in source channels); bits W1, W2 designating the data width of the request (1, 2 or 4 data words to be fetched or stored); and bit A0 used in association with 1-wide input requests. Bit A0, referred to as "bit 29" in the above-referenced application by Krygowski entitled "Channel Storage Adapter", is an address bit which is not forwarded to the CBC. It is used by adapter 19 in selecting a data tag, D1 or D2, for presentation to the CBC in association with the data intelligence of respective 1-wide input request.

When enable line 54 is active a request queued in adapter 19 may be transferred over interconnections 18.1. The transfer takes a variable number of cycles 70 (FIGS. 3, 4); the number being a function of the request type and width. As indicated previously tag ADR is raised by controls 42 when address intelligence of any request is transferred on In Bus 53. Data tag D1 or D2 is raised selectively by controls 42 when data intelligence of any input request is transferred on bus 53. QW tag is raised by controls 42 to indicate the "second half" of a 4-wide request transfer. It enables the CBC to develop an implicit address by inverting a bit in the explicitly transferred address. EOT tag is raised to indicate demarcation of requests and of "halves" of 4-wide requests. EOT in conjunction with D1 or D2 is also used to specifically distinguish 1-wide Store requests, and enables the CBC to void, and sustain parity in, data transfer paths between the individual CBAR's and array 50.

Received tags ADR, D1 and D2 are used by the CBC to steer address and data intelligence portions of requests from the In Bus 50 into specific associated sections of CBAR 46 (FIG. 2). QW tag is used by the CBC to "imply" the second address of each 4-wide request. The implication is effected by inverting a low order address bit in the explicit address intelligence (retained in CBAR 46) when the intelligence of the second request is transferred to array 50.

EOT tag is used by the CBC as a demarcation function and as an indicator of certain request types requiring prearranged nullification action. In demarcation usage a "CBAR full" indication is set when EOT is received. This makes the contents of register 46 eligible, subject to group priority considerations, for transfer to buffer array 50. In request indication usage EOT in conjunction with D1 or D2 and a previous ADR designates a 1-wide Store request and is used by the CBC to set up the transfer of 0's (null intelligence) with "correct" parity into an "unused" one of two data word transfer paths between CBAR 46 and array 50.

When storage 10 is accessible requests are passed from array 50 to storage, subject to group priority considerations.

Format of Request Signals

The format of request signals handled over interconnections 18.1 is indicated in FIG. 5. Each request comprises a request address word having the form indicated generally at 102. Each input request comprises one or more data words each having the format indicated generally at 104.

Each request address word comprises a 21-bit address field 105 which designates the location 106 (FIG. 6) of a doubleword storage space in main storage 10 (FIG. 1). In addition, each address word comprises a 4-bit field (SP) used for storage protection, a 4-bit field (CHID) serving to indicate the identity of the request source, a 1-bit field S serving to indicate the request type (as "Store" if S = 1 or "Fetch" if S = 0), a 1-bit field FA serving to indicate whether a predetermined address translation is required (the specifics of such translation being non-relevant to the present invention), a bit P indicating parity of bits S and FA, and a field of five "spare" bits (to allow for expansion). In addition to the foregoing 36 "intelligence" bits the request address word comprises five non-shown parity bits which are used by the CBC for checking portions of the 36-bit word "expression" formed by the twenty-one address bits, SP, CHID, S, and FA, P and the four spare bits. A parallel signal representation of this "expression" is transferred together with the five parity bit signals, as a 41-bit "word expression" over the 41-line In Bus 53 (FIG. 2).

The data word 104 used in input requests comprises a 41-bit expression consisting of thirty-six intelligence bits and five not-shown parity bits. The intelligence bits comprise four 8-bit data bytes and a field of four mark bits. Each mark bit is associated with a different respective one of the four data bytes. The mark bits are used by storage system 10 to determine which of the associated data bytes are to be stored contiguously within the space designated by the address intelligence of the address word expression.

Interface Signal Timing

Timing of Fetch request transfers from adapter 19 to CBC 16 is indicated in FIG. 3. Cycles of signaling operation 70 coincide with cycles of internal operation of adapter 19 and IOP system 30. Half cycles of interconnection signaling operation, indicated at 72, coincide with full cycles of internal operation of CBC 16 and of access controls associated with system 10.

In the presently described embodiment requests may be transferred to the CBC from any SA only when the associated Enable line 54 is active as suggested at 110 and one "idle" cycle has elapsed since a previous EOT. Enable line 54 (FIG. 2) is active whenever either the associated CBAR register (register 46, FIG. 2) or the associated queueing space within In Buffer array 50 (FIG. 2) contains a vacancy relative to request traffic of the associated SA.

In a doubleword (2-wide) Fetch transfer 112 request intelligence transferred on the In Bus consists only of an address word expression such as 102 (FIG. 5). This word is presented on In Bus 53 while ADR and EOT tags are presented coincidentally on respective lines 56 and 64 (FIG. 2). Transmission of such requests in the present embodiment occupies three consecutive cycles; an active cycle 114 in which the address word expression and the ADR and EOT tags are presented; and two idle cycles 115 during which no signaling takes place.

The intelligence of a quadword Fetch request 118 (FIG. 3) similarly comprises only one address word. However, the transfer of the request occupies five consecutive cycles in the present embodiment. In the first cycle 120 the address word is send coincident with ADR and EOT tags. The next cycle 121 is idle. In the next (third) cycle 122, QW and EOT tags are presented, as suggested at 124 (observe that these tags are sent without any intelligence passing over the In Bus). As explained previously the QW tag is utilized by the CBC to provide implicit handling of each 4-wide request as two 2-wide requests from one source. The address intelligence furnished in cycle 120 is used twice by the CBC but with a low order bit inverted on the second usage. The two cycles following cycle 122 are idle. Observe that D1 and D2 tags are no used during forwarding of Fetch requests.

Referring to FIG. 4 input (Store) requests have three possible widths; singleword (1-wide), doubleword (2-wide) and quadword (4-wide). Store requests are transferred during cycles 70 identical in timing to the cycles utilized for transfer of Fetch requests. Enable line 54 (FIG. 2) must be in enabling (active) condition for any Store request to be forwarded.

In the present embodiment transfer of a 1-wide Store request, indicated at 140, occupies three consecutive cycles. Transfer of a 2-wide Store request, indicated at 142, occupies four consecutive cycles. Transfer of a 4-wide Store request, indicated at 144, occupies seven consecutive cycles.

In a 1-wide Store transfer the first cycle 150 is used to transfer address intelligence over In Bus 53 (FIG. 2) coincident with presentation of (address) tag ADR on address tag line 56 (FIG. 2). In the second cycle 152 data intelligence is transferred over the In Bus while EOT tag and one of the two data tags, D1 or D2, are presented on respective tag lines. D1 tag is presented if bit A0 mentioned above has 0 value and D2 tag is presented if bit A0 has 1 value. The EOT tag presented in cycle 152 serves both as a demarcation function and in conjunction with D1 or D2 (and ADR in the preceding cycle) to indicate that a 1-wide Store request is being transferred. This is used by the CBC on an "early" (lookahead) basis to carry out voiding actions relative to one of two data word transfer paths between CBAR 1 (FIG. 2) and array 50 and parity sustaining actions relative to parity check circuits 46.1 (FIG. 2) coupled to said paths.

In this embodiment transfer of a 2-wide Store request 142 occupies four consecutive cycles. In the first cycle 156 address intelligence is transferred on In Bus 53 (FIG. 2) while ADR tag is presented on tag line 56 (FIG. 2). In the next two cycles, 158 and 160, two data words are transferred on In Bus 53 in the order of reception of such words by the source channel. In these cycles data tags D1 and D2 are presented in a selective order (D2 first if directionality bit B = 1, D1 first if B = 0). In cycle 160 EOT tag is presented as a demarcation function. The cycle following cycle 160 is idle.

The transfer of a 4-wide Store request indicated at 144 (FIG. 4) occupies seven consecutive cycles. The first cycle 170 is utilized to send the "explicit" address part of the request together with ADR tag. The next two cycles 172 and 174 are utilized to forward two words of data intelligence in the order of channel reception while associated data tags are presented in a selective sequence (D2 first if B = 1, D1 first if B = 0). EOT is presented in cycle 174 as demarcation of "half" of the transfer. The next (fourth) cycle is idle and is used by the adapter to test Enable line 54 (FIG. 2) for permission to transmit on subsequent cycles. The next two cycles 176 and 178 are used to send two more data words from the same source (e.g., channel) while associated data tags are presented in the same sequence as in cycles 172 and 174. EOT tag is presented in cycle 178. QW tag may be sent either in cycle 176 or cycle 178 (not both) as suggested at 180. In a mode analogous to handling of 4-wide Fetch the QW tag is used by the CBC to provide implicit handling of each 4-wide Store request as two 2-wide Store requests (from one source) directed to two contiguous doubleword spaces in storage.

FIG. 15 illustrates a "worst case" situation of request transfer traffic in which requests are coincidentally being forwarded by SA1, SA2 and SA3; with respective EOT tags being presented simultaneously. This means that CBAR 1, CBAR 2 and CBAR 3 (FIG. 2) are simultaneously set to "full". Assuming that In Buffer 50 contains vacant spaces relative to each CBAR the three CBAR's would empty into buffer 50 in three consecutive CBC cycles corresponding to 1½ cycles of request transfer signaling as indicated in the three lowest lines in FIG. 15. By having each SA allow one idle cycle to elapse after its respective EOT before it resumes request signaling (as suggested in the upper three lines of this figure) the respective CBAR registers could be "continuously" accessible as shown (and therefore the respective "enable" control lines could be held continuously active if the path from buffer 50 to system, in FIG. 2, should be clear).

Storage Space Usage

FIGS. 7 and 8 illustrate usage of storage spaces in respect to input requests associated respectively with Read and Read Backward operations of source channels. These illustrations apply both to prior art systems and to the present system. FIG. 7 shows that in Read operations successive storage accesses are used to place input data words in storage at address locations arranged in an "ascending" arithmetic progression. FIG. 8 shows that in Read Backward operation data is stored in address locations arranged in a descending progression; whereby the first data word received by the channel is positioned in the "first" (highest address) word space of an allotted storage area of plural contiguous word spaces and the last data word received by the channel is placed in a "last" (lowest address) space of that area. Consequently when the record is scanned out of storage in the "ordinary" ascending progression of addresses the data words (and bytes) will be retrieved in reverse order (relative to the order of reception by the channel).

FIG. 9 is used to illustrate a complication that this poses relative to handling of 4-wide input requests. In the transfer handling of 4-wide input requests associated with Read Backward operations in the channels each pair of data words received (assembled) by a channel must be reversely oriented in position relative to a doubleword space in storage (106, FIG. 6).

In the present system the need for the channels to provide such orientation is avoided by the use of data tags (D1, D2) relative to data words presented in the "natural" sequence of reception by the channel. Shared storage access circuits in the CBC respond to the data tags and thereby reversely position the words of each pair of data words associated with a Read Backward sequence in the space 106 allotted to said pair.

Operation of Storage Adapter

Figure 10:
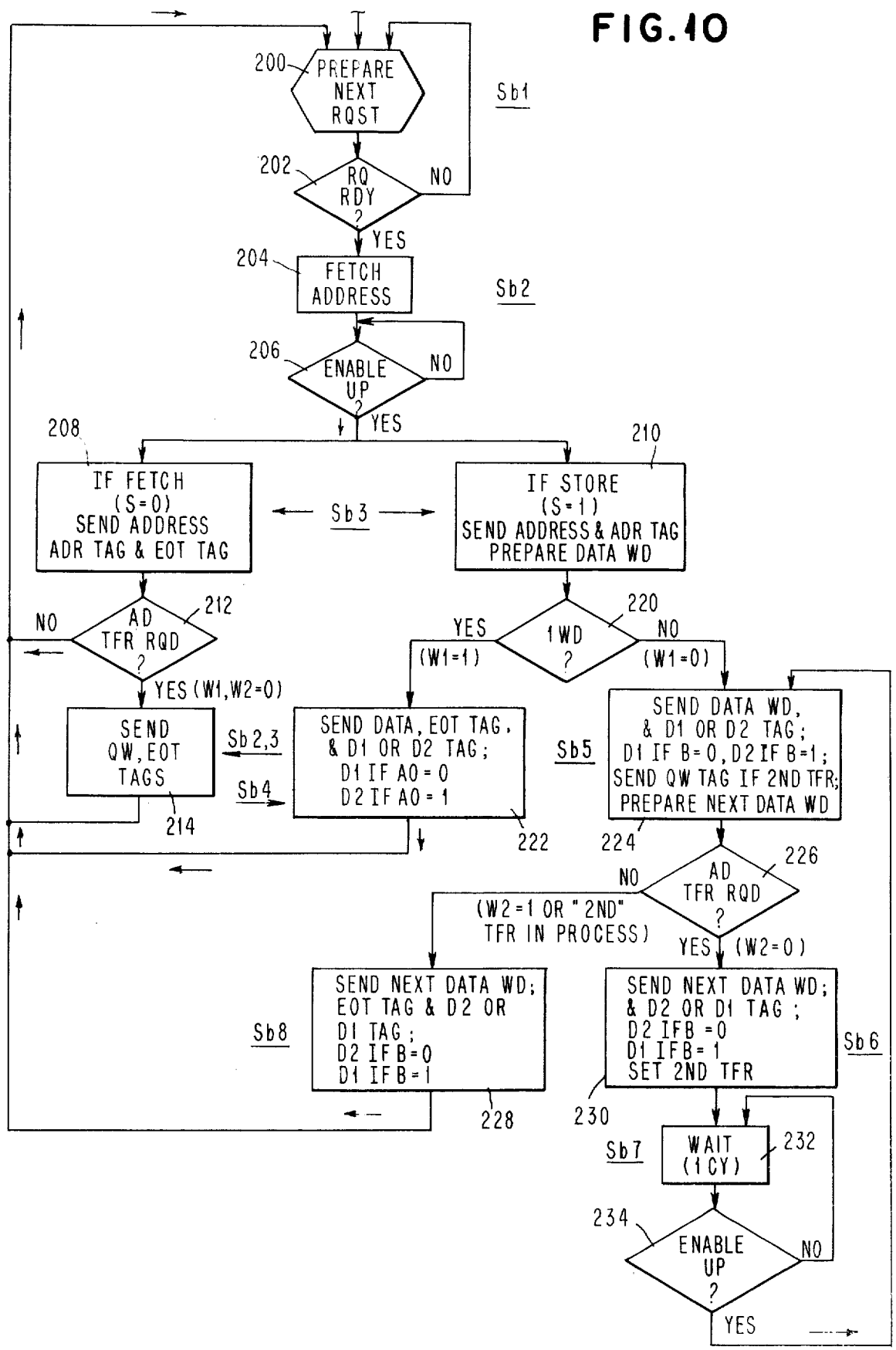
FIGS. 10 and 11 are flow diagrams illustrating respective operations of the first adapter (storage adapter) and second adapter (channel bus controller) elements of the subject system in respect to the forwarding of requests.
Figure 12:
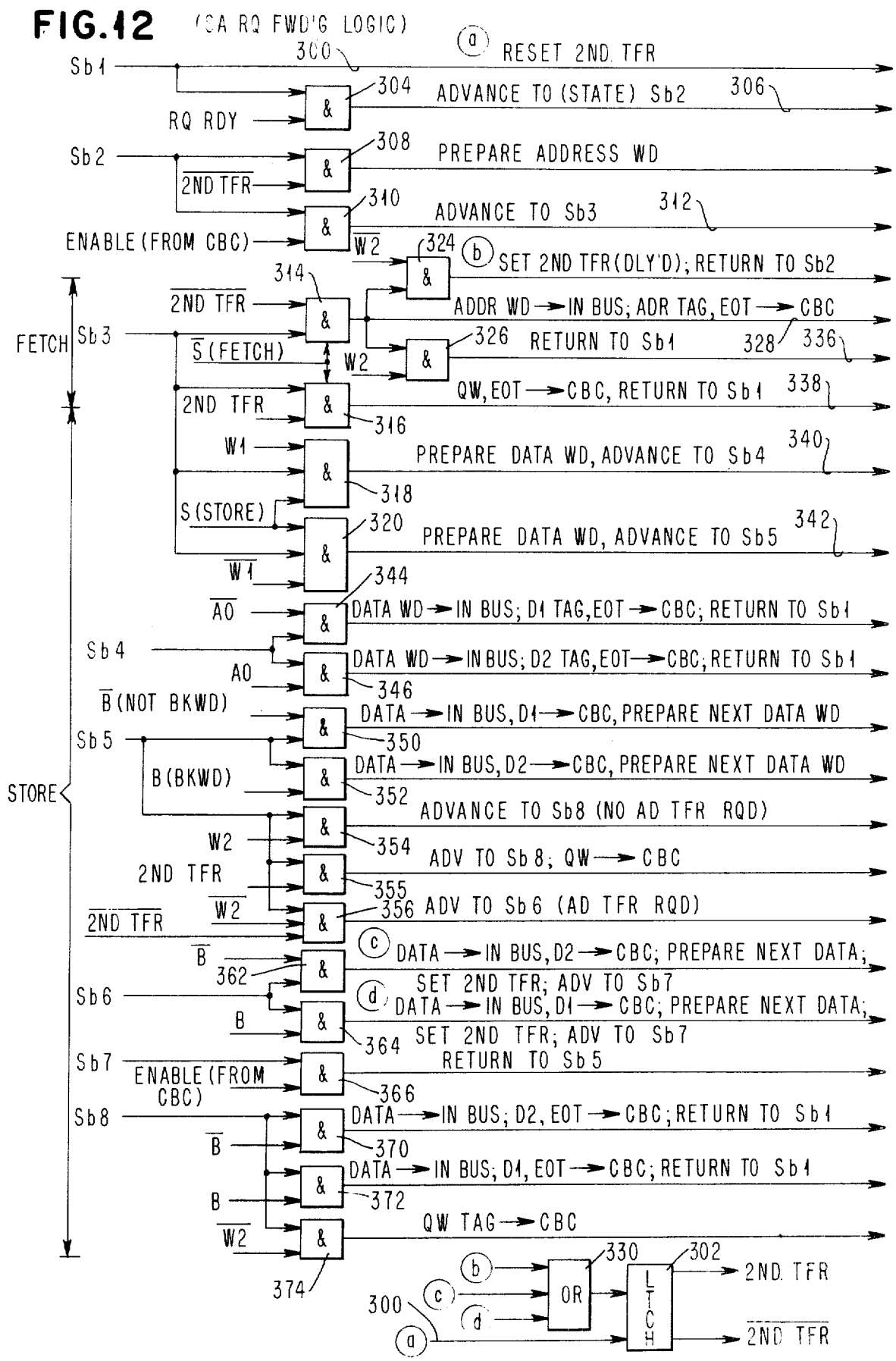
FIG. 12 illustrates logic employed in the subject storage adapter to forward requests.

Operation of a group adapter such as SA1 (FIG. 2), in respect to the forwarding of requests, is illustrated in FIG. 10. Associated control logic is shown in FIG. 12. Such operations and logic are also described in the above-referenced patent application by Krygowski entitled "Channel Storage Adapter". The controls 42 (FIG. 2) comprise an 8-state sequencer, described in said Krygowski application; said sequencer having eight distinct sequence control states Sb1, Sb2 . . . , Sb8.

In initial state Sb1, shown at 200 in FIG. 10, action is taken to prepare the adapter for the forward handling of a next request. Transfer to the next state Sb2 is conditioned on Request Ready status 202. Request Ready condition is established by IOP 30 (FIG. 2) when a request is enqueued in adapter 10, and terminated when state Sb2 is reached if only one request is currently enqueued.

In state Sb2 actions indicated at 204 (FIG. 10) are invoked. The address word portion of the request is fetched from buffer array 40 and buffer elements within controls 42 (FIG. 2) in preparation for transfer subsequently to the CBC. If line 54 is active (test 206) the sequencer advances to state Sb3.

The action taken in state Sb3, 208 or 210, is conditional on the request type (i.e., the state of bit S furnished to adapter 19 via bus 82, FIG. 2). Action 208 is associated with handling of a Fetch request (S = 0) and action 210 with handling of a Store request (S = 1).

Action 208 gates the address word part of the request (102, FIG. 5) to the CBC (via In Bus 53, FIG. 2) for one cycle, and also transfers ADR and EOT tag signals to the CBC at the same time (via ADR tag and EOT tag lines, 56 and 64, FIG. 2). Action 210 transfers the address word part of the request with ADR tag (but no EOT tag) for one cycle and prepares a data word (104, FIG. 5) during that cycle for transfer in the next cycle (see FIG. 4). The data word is prepared by extracting it from queueing array 40 (FIG. 2) and holding it in a register directly linkable to the In Bus.

When the request is a Fetch the sequence branches at state Sb3 either to state Sb1 or to state Sb2, via branch test 212. If no additional transfer is required (i.e., if the request is 2-wide or if the forwarding process of a 4-wide transfer is concluding, as in cycle 122, FIG. 3) the sequencer returns to initial state Sb1. If additional action is required (sending of QW tag for a 4-wide request) the sequencer repeats states Sb2 and Sb3 to perform action 214. In this repetition of states Sb2 and Sb3, Sb2 invokes an idling ("no operation") cycle, corresponding to cycle 121 (FIG. 3) and Sb3 invokes the action of transferring the QW and EOT tags on respective tag lines 62 and 64 (FIG. 2) corresponding to cycle 122 (FIG. 3). The sequencer then returns to initial state Sb1.

If the request being transferred is a Store the sequencer branches at Sb3 via "1-wide" branch test 220 (FIG. 10) either to state Sb4 (associated with 1-wide request manifested by "on" condition of width bit W1, furnished via bus 82, FIG. 2) or to state Sb5. In state Sb4 operation 222 (FIG. 10) is performed. In state Sb5 operation 224 is performed.

Operation 222 transfers a data word (prepared by operation 210 in the preceding cycle) to the CBC with EOT tag and with one of the data tags D1 or D2. Th choice of which data tag is presented is made as a function of the state of bit A0 (see FIGS. 2, 4 and 6). This choice determines whether the associated data word will be stored eventually in the 0 or 1 word space, 106.1 or 106.2 (FIG. 6), within the doubleword space 106 designated by the request address (the address transferred in operation 210). Operation 222 completes the handling of the 1-wide request and the sequencer returns to intial state Sb1.

In operation 224 associated with state Sb5 (i.e., with handling of a 2-wide or 4-wide input request) the data word prepared by operation 210 in the preceding cycle is sent to the CBC with a data tag, either D1 or D2. The choice of D1 or D2 is made as a function of directionality bit B (FIG. 2) and determines whether this first data word will be stored in the left or right half, 106.1 or 106.2, of the doubleword space 106 designated by the request address. Operation 224 also includes preparation of another (second) data word which is to be sent in the next cycle. If operation 224 is being performed relative to a "second" transfer (i.e., transfer of a second pair of data words of a 4-wide input request; see FIG. 4), its action includes presentation of QW tag on the CBC.

From state Sb5 the sequence branches at 226 either to state Sb6 or state Sb8. If no additional transfer is required (i.e., if bit W2 = 1 signifying a 2-wide request or if "second transfer" condition is set signifying that the transfer handling of a second pair of data words of a 4-wide Store request is in process) the sequence branches to Sb8 in which concluding operation 228 is performed before the sequence returns to initial state Sb1. In operation 228 the data word prepared by operation 224 is forwarded to the CBC with EOT tag and a data tag, either D1 or D2. Choice of D1 or D2 is dependent on the state of directionality bit B (if B = 0, D2 is sent; if B = 1, D1 is sent). Consequently when B = 1 (signifying backward directionality) the pair of data words transferred consecutively by operations 224 and 228 are accompanied respectively by D2 and D1 tags (in that order) and will be stored respectively in word sub-spaces 106.2 and 106.1 of the doubleword space 106 (FIG. 6) designated by the address.

If the sequence branches at 226 to Sb6 (i.e., if additional handling is required; meaning that the request is a 4-wide request and the transfer process relative to the first two of the four data words is incomplete) operation 230 is performed. In operation 230 the data word prepared during operation 224 is transferred to the CBC with data tag D2 or D1. If D1 was presented in operation 224, D2 is presented in operation 230 and vice versa.

From state Sb6 the sequence automatically advances to state Sb7. In this state idling action 232 is performed for at least one cycle after which "enable" branch 234 permits the sequence to return to state Sb5. Enable branch 234 is conditioned on the state of line 54 (FIG. 2) controlled by the CBC. If Enable line is up the sequencer advances to state Sb5. If it is not up the sequencer remains in state Sb7.

In the second iteration of state Sb5 and the associated operation 224 (i.e., in which the third of four data words of a 4-wide Store request is transferred to the CBC) quadword tag QW may be presented to the CBC. In the second passage through branch 226 the sequence invariably branches to state Sb8 (this being the second transfer part of the 4-wide transfer). In Sb8 operation 228 is performed, completing the 4-wide transfer, and the sequence returns to Sb1.

The storage adapter 19 is shown in FIGS. 7–11, 14, 15 of the above-referenced patent application by Krygowski entitled "Channel Storage Adapter". The sequencer and associated logic for evoking the operations indicated in FIG. 10 in the present application are shown in FIG. 15 of the said Krygowski application. Salient features of said logic are indicated in FIG. 12 in the present application.

Line 300 (top of FIG. 12) connects to reset input of "2nd Transfer" latch 302 (shown at the bottom of FIG. 12). Line 300 is activated by operation 200 (FIG. 10) associated with state Sb1. Set condition of latch 202 partially conditions branches 212 and 226 (FIG. 10). Sb1 (operation 200) also prepares AND circuit 304 (FIG. 12) which, in response to "request ready" (controlled by I/O processor 30, FIG. 2), activates line 306. (FIG. 12). Activation of line 306 permits the sequence to step to its next state Sb2 invoking operation 204 (FIG. 10).

State Sb2 prepares AND circuits 308 and 310 (FIG. 12). AND circuit 308 controls operation 204 relative to this state. AND 310 controls advancement to state Sb3. If second transfer latch 302 is not set ($\overline{2\text{nd TFR}}$) — i.e., if the preceding state was Sb1 — AND 308 produces output "prepare address word". This output causes the intelligence including the "explicit" address part of the request to be extracted from data buffer array 40 and controls 42 (FIG. 2) in preparation for transmission of said intelligence in the next cycle of operation. If, however, second transfer latch 302 is in set condition when Sb2 is effective (which will be the case if Sb2 is reached from state Sb3 via branch 212, FIG. 10) then no action will take place during the cycle of operation associated with Sb2.

AND circuit 310 (FIG. 12) responds to Sb2 and enabling condition on the associated "group enable" line 54 (FIG. 2) to stimulate line 312. This allows the sequence to step to its next state Sb3. In this state one of the operations 208 or 210 (FIG. 10) is carried out. If the request is a Fetch type request (S = 0; denoted also by $\overline{S}$) AND circuits 314 and 316 will be prepared. These circuits respond to respective complementary phase outputs of 2nd Transfer latch 302, when Sb3 is effective, to produce signals which control transfer of address information and QW and EOT tags. AND 314 is also used to determine if an additional transfer is required (branch 212, FIG. 10). On the other hand if the request currently being processed is a Store type request (S = 1) AND circuits 318 and 320 will be prepared, by complementary phase inputs associated with width bit W1 (FIG. 2), and operate to distinguish whether the transfer is 1-wide or wider (branch 220, FIG. 10.

AND circuit 314 (FIG. 12) responds specifically to $\overline{S}$ (Fetch), Sb3 and reset condition of second transfer latch 302. AND circuit 316 responds specifically to $\overline{S}$, Sb3 and set condition of latch 302. Operation of AND 314 prepares AND circuits 324 and 326. Operation of AND 314 also gates the address word and ADR and EOT tags to the CBC (via the In Bus and respective tag lines) as suggested at 328 (FIG. 12).

AND 324 responds to "off" phase $\overline{W2}$ of width bit W2 (which signifies a width of four when the request is a Fetch) to transfer delayed set stimulation to 2nd Transfer latch 302 via a not-shown delay and OR circuit 330 (at the bottom of FIG. 12). Operation of AND 324 also permits the sequence state to step to state Sb2.

AND 326 responds to "one" phase of W2 (indicating 2-wide when the request is a Fetch. Operation of AND 326 causes the sequencer to return to initial state Sb1 as suggested at 336.

Response of AND circuit 316 (associated with handling of a 4-wide Fetch request) stimulates line 338. This causes EOT and QW tags to be sent to the CBC via the QW and EOT tag lines (see operation 214, FIG. 10, and cycle 122, FIG. 3) and also causes the sequencer to return to its initial state Sb1.

Response of AND circuit 318 (to Sb3 coincident with W1 and S. associated with handling of a 1-wide Store type request) stimulates line 340. This causes retrieval of a data word from data buffer 40 (FIG. 2) in preparation for its transmission in the following cycle and also stimulates the sequencer to step from state Sb3 to state Sb4 (associated with operation 222, FIG. 10).

Response of AND circuit 320 (to Sb3 coincident with W1 and S indicating a Store request having width greater than one) activates line 342. This invokes preparation of the data word which is to be sent in the next cycle (see operation 210, FIG. 10) and steps the sequencer state from Sb3 to Sb5.

Figure 6:
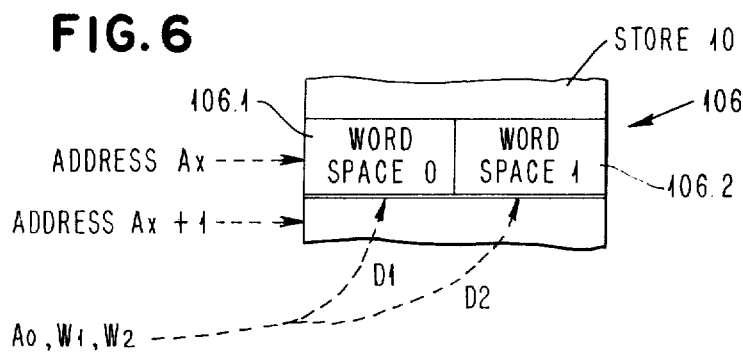
FIG. 6 illustrates the location in storage of spaces designated by the address word part of an input request and D1 and/or D2 tags accompanying such a request.

State Sb4, associated exclusively with handling of a 1-wide Store type request (refer to line 340, FIG. 12 and operation 222, FIG. 10) prepares AND circuits 344 and 346. AND circuit 344 responds to "off" state of bit A0. AND circuit 346 responds to "on" state of bit A0. Recall that bit A0 is furnished by a channel 32 (FIG. 1) or IOP (FIG. 2) and effectively designates one of the subspaces 106.1. or 106.2 (FIG. 6). Response of either circuit 344 or 346 causes the data word prepared by the operation associated with response of AND 318 to be transferred (gated) to the CBC with EOT tag. Response of circuit 344 also causes D1 tag to be presented to the CBC whereas response of circuit 346 causes D2 tag to be presented (see operation 222, FIG. 10). Operation of either circuit 344 or 346 causes the sequencer to step from state Sb4 to Sb1.

State Sb5 prepares AND circuits 350, 352, 354, 355 and 356 which operate as follows. AND circuit 350 responds to off state $\bar{B}$ of bit B, signifying not backward directionality, to cause a data word previously prepared in state Sb3 to be sent to the CBC with D1 tag and to cause preparation of another data word for the next cycle of transfer (cycle 174 or 178, FIG. 4). AND circuit 352 responds to "on" state of B (signifying Read Backward operation in the origin channel) causing data to be sent to the CBC with D2 tag and preparation of the data word to be sent in the next cycle.

State Sb5 and "on" state of W2 (signifying a 2-wide Store request requiring no additional handling) activate AND circuit 354 which conditions the sequencer to step from state Sb5 to state Sb8. Sb5 and set state of "2nd Transfer" latch 302 (signifying a 4-wide Store request in the final stages of handling) activate AND circuit 355 which causes QW tag to be presented to the CBC, with the data transferred by the operation of AND 350 or 352, and steps the sequencer to Sb8. Sb5, reset state of latch 302 and "off" state of W2 (signifying "early" handling of a 4-wide Store request) activate AND circuit 356 causing the sequencer to advance to state Sb6. AND circuits 362 and 364 respond respectively to "off" and "on" states of directionality bit B, coincident with Sb6. Operation of either circuit causes previously prepared data to be transferred to the CBC (with D2 tag if AND 362 is operated and D1 if AND 364 is operated). Response of either circuit 362 or 364 causes delayed setting of latch 302 and causes the sequencer to step to state Sb7.

State Sb7 associated with idling operation 232 (FIG. 10) provides preparation of AND circuit 366 after one cycle of delay (not shown). AND 366 responds to "on" state of the associated group enable signal (from the CBC) to cause the sequencer to return to state Sb5. In this iteration of state Sb5 one of the AND circuits 350 or 352 operates to pass data to the CBC, with QW tag and the appropriate one of tags D1 and D2, while next data is prepared and AND circuit 355 operates to advance the sequencer automatically to state Sb8.

Sb8 prepares AND circuits 370, 372 and 374. AND circuits 370 and 372 respond respectively to off and on states of bit B and cause data to be presented to the CBC with either D2 or D1 tag respectively and with EOT tag. AND circuit 374 responds to off state of width bit W2 (signifying handling of a 4-wide Store request) to forward QW tag to the CBC. State Sb8 is followed by state Sb1.

Request Reception and Queueing Operation in the CBC

Figure 11:
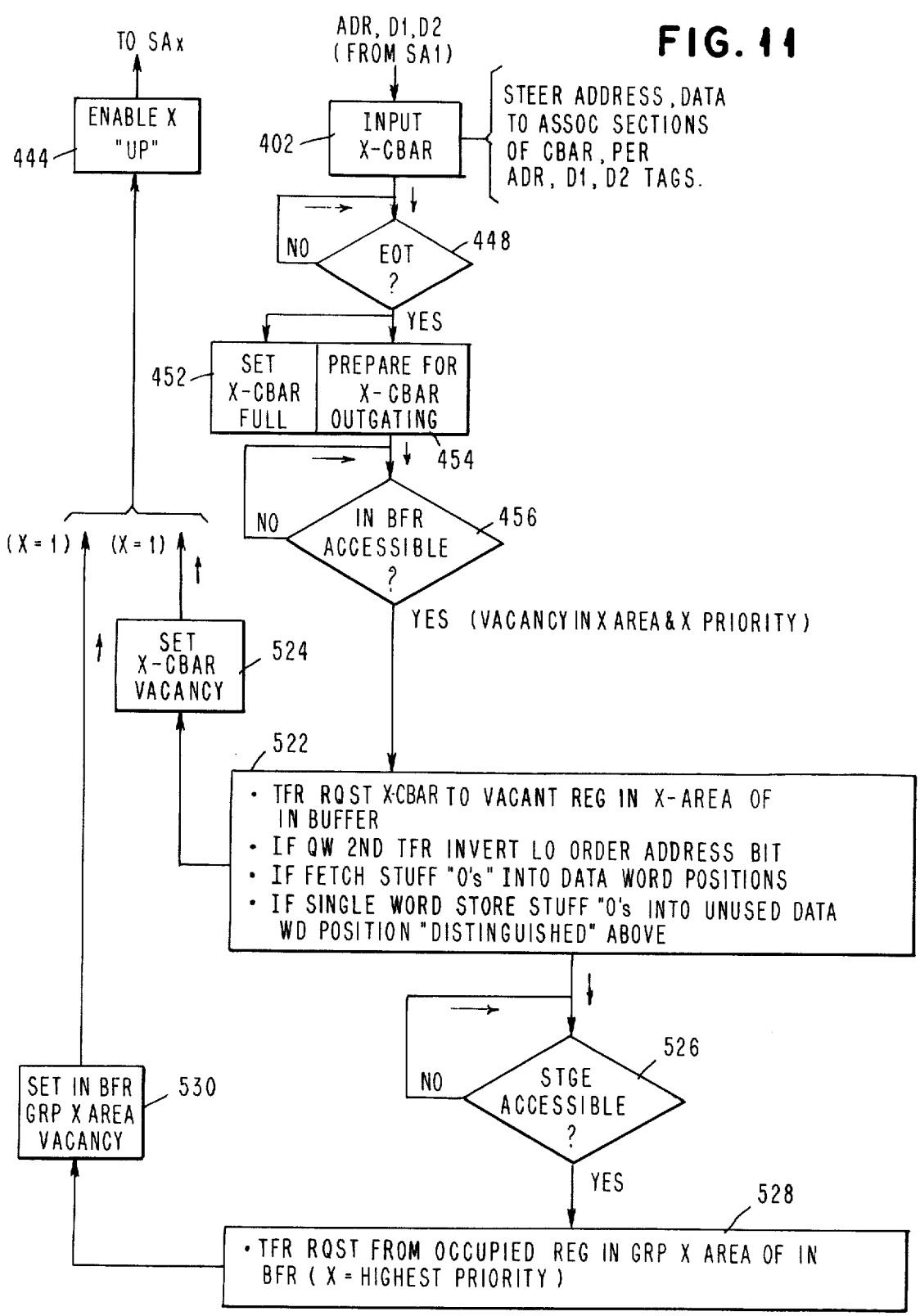
Figure 13:
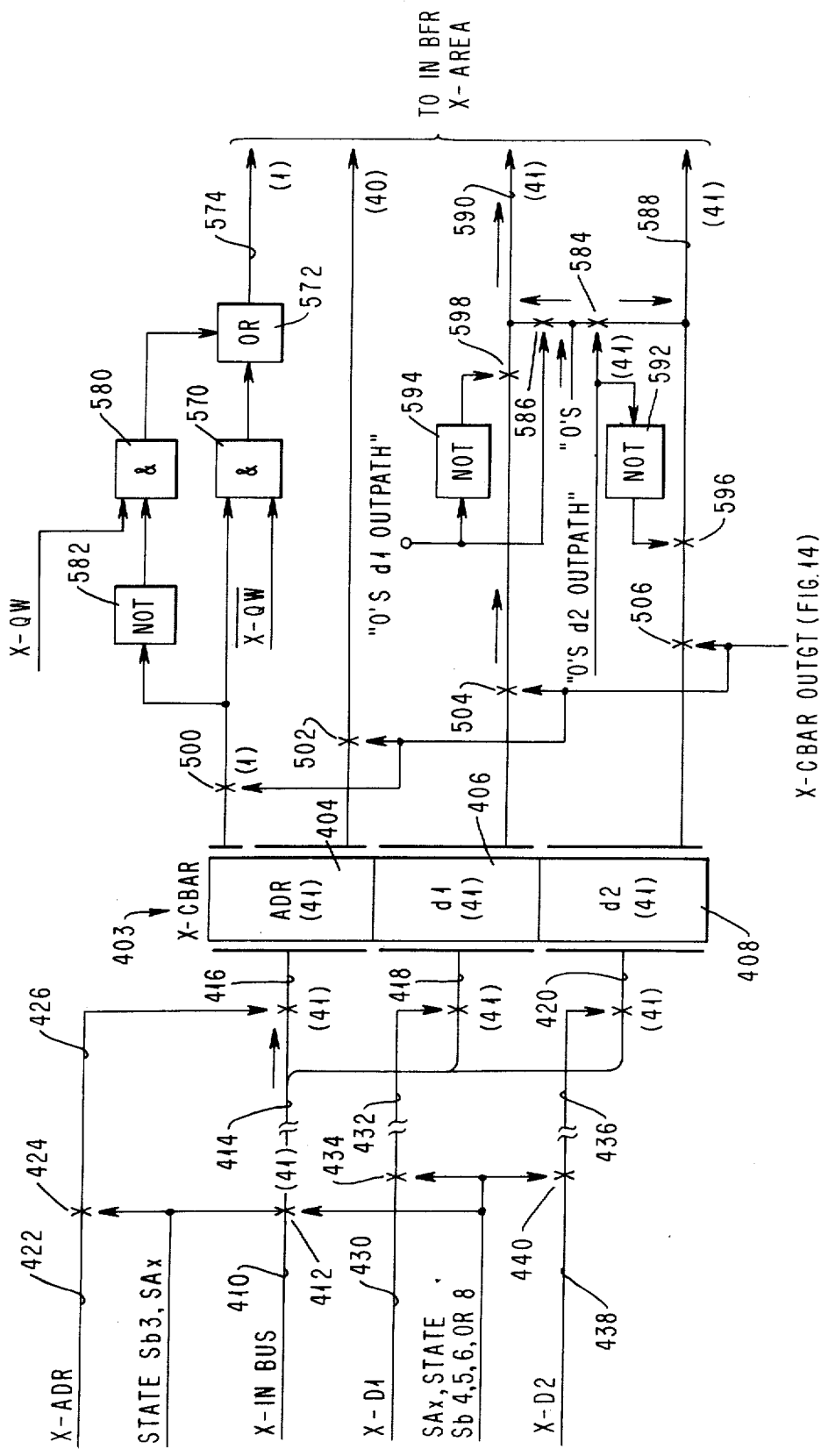

Request reception and queueing in the CBC is illustrated in flow diagrammatic form in FIG. 11. Associated logic is indicated in FIGS. 13 and 14. Full details of the operation and construction of the CBC are provided in the above cross-referenced patent application by Capowski et al entitled "Channel Bus Controller". Details salient to the present invention are shown in FIGS. 11, 13, and 14 of this application.

FIG. 11 shows that reception of ADR and data tag from any group adapter SAX (X = 1, 2 or 3) invokes operation 402. Address and data word parts of an associated request (arriving on the Group X In Bus) are steered thereby into respective 41-bit sections of associated X-CBAR 403 (FIG. 13). X-CBAR 403 consists of three 41-bit sections 404, 406 and 408 (FIG. 13). Section 404 is used exclusively to receive address intelligence accompanied by ADR tag. Section 406 (d1) receives only data intelligence accompanied by D1 tag. Section 408 (d2) receives only data intelligence accompanied by D2 tag.

Group X In Bus 410 (FIG. 13) extending from the storage adapter connects, through switches indicated schematically at 412 (FIG. 13), to continuation bus path 414 (FIG. 13). Continuation path 414 links switchably to X-CBAR sections 404, 406 and 408 via respective switches indicated at 416, 418 and 420 (FIG. 13).

Switches 412 (FIG. 13) may be implemented as internal logical elements of the storage adapter associated with Group X. Switches 412 are operated during states Sb3, Sb4, Sb5, Sb6 and Sb8 of the control sequencer associated with controls 42, FIG. 2, and provide signaling "continuity" to path 414 whenever address or data information is required to be passed to the X-CBAR.

X-ADR tag signals originate on line 422 and connect via gate 424 to line 426 (FIG. 13). Gate 424 which may be an internal logic element of the associated group adapter is operated when the associated control sequencer of said adapter is in state Sb3. Line 426 controls the connective states of switches 416. Consequently when address information is presented on Group X In Bus 410 switches 412, 424 and 416 will operate to provide signaling continuity from bus 410 to the input of section 404 of X-CBAR 403.

D1 tag signals originated by the respective group storage adapter pass via lines 430 and 432 to exert control over switches 418. Lines 430 and 432 are connectively linked by gate 434 internal to said adapter which is operated selectively during the transfer of data on In Bus 410 (refer to operations 222, 224, 228 and 230 in FIG. 10). Consequently when D1 tag is transferred through gate 434 associated data on In Bus 410 will be connectively passed through switches 418 into section 406 of X-CBAR 403.

Switches 420 are operated when D2 tag appears on line 436. D2 tag is transferred to line 436, from line 438 associated with the source adapter, by operation of gate 440 internal to the source adapter. Gate 440 is operated when the associated sequencer circuit of the respective group adapter is in one of the states Sb4, Sb5, Sb6 or Sb8 and the state of the associated directionality bit B or in the case of Sb4 the state of bit A0 is in the appropriate state for presenting D2 tag (refer to operations 222, 224, 228 and 230, FIG. 10). When D2 tag is applied to switches 420 the In Bus path 410, 414 is effectively linked to section 408 of X-CBAR 403.

X-EOT tag received by the CBC on line 442 (FIG. 14) sets latch 443 (FIG. 14) to provide "X-CBAR full" indication. Input operations 402 (FIG. 11) are conditioned on operation 444 (FIG. 11); i.e., presentation of enable signal to the associated (X) group adapter. Presentation of enable signal to the associated group adapter is conditioned on vacancy either in X-CBAR or in the X area of In Buffer array 50.

On reception of EOT tag the CBC branches at 448 (FIG. 11) to perform operations 452 and 454 (FIG. 11). Operation 452 establishes the "X-CBAR Full" condition and thereby renders the contents of X-CBAR 403 eligible to be transferred to the X area of In Buffer array 50 (FIG. 3) subject to In Buffer accessibility test 456. Test 456 is conditioned on X priority and vacancy in the X area of In Buffer 50. Operation 454 prepares circuit paths for outgating of X-CBAR 403 of array 50.

Such outgating preparation varies according to the type of request being received in X-CBAR 403. Latch 460 (FIG. 14) is employed to indicate implicit address generation.

Latches 464 and 466 (FIG. 14) distinguish reception of data in X-CBAR 403 in association with respective group X tags D1 and D2.

Reset condition of latch 464 (FIG. 14) prepares AND circuit 476 (FIG. 14). Reset condition of latch 466 prepares AND 480. AND's 476 and 480, when prepared by outputs of respective latches 464 and 466, respond to command signal "X-CBAR Outgate" and control insertion of null data (0's with "correct" parity) into output busing paths associated with respective sections 406 and 408 of X-CBAR 403 (FIG. 13).

Signal "X-CBAR Outgate" represents set state of latch 490 (FIG. 14) produced in response to operation of AND circuit 492. Operation of AND 492 occurs when: X-CBAR is full (latch 443 in set condition), X-area of In Bfr array 50 (FIG. 2) is not full and X has priority (no higher priority group CBAR is contending for access to an associated vacant space in array 50). Indication of "not full" status in the X-area of array 50 is obtained by means of logic decribed later. "X-CBAR Outgate" also operates switches 500, 502, 504 and 506 (FIG. 13) to forward contents of associated sections of X-CBAR 403 relative to bussing circuits which link eventually to In Buffer array 50. "X-CBAR Outgate" also disables all lower priority "Group CBAR Outgates" as indicated at 507 (FIG. 14) and resets "X-CBAR Full" latch 443, FIG. 14 (after a not-shown delay if required). "X-CBAR Outgate" also resets latches 460, 464 and 466 (after suitable not-shown delays if required).

The X-area of In Buffer 50, detailed in the aboveferenced patent application 781,895 by Capowski et al, consists of two 123-bit request storage spaces reserved for Group X requests. The logic 508 (FIG. 14) for selecting one of the two spaces to be written into (space X-Y) is detailed in FIG. 12 of said application 781,895 by Capowski et al. Said logic responds to "X-CBAR Outgate" to make the selection and set associated latch 510 (FIG. 14). Set state of latch 510 indicates occupancy of the selected space. Logic 512 (FIG. 14) — detailed in FIG. 16 of said application 781,895 by Capowski et al — determines when to transfer contents of said X-area spaces to storage and resets the associated latch 510 to indicate vacancy of the associated space. Such space vacancy indications operate through OR circuit 516 (FIG. 14) to provide "area" vacancy indications to associated AND circuit 492 (as a condition precedent to setting "X-CBAR Outgate" control latch 490, FIG. 14) and OR circuit 520 (which provides "X-Enable" signal 444.1, FIG. 14, associated with operation 444 (FIG. 11).

The foregoing outgating transfer from X-CBAR to array 50 is shown operationally in FIG. 11 at 522. The associated conditioning of X-CBAR vacancy (not full) indication is shown operationally at 524.

Prioritization of the foregoing transfer from array 50 to storage system 10 is indicated operationally at 526 (FIG. 11) and execution of said transfer is indicated at 528 (FIG. 11). Conditioning of the associated X-area vacancy indication is suggested operationally at 530 (FIG. 11).

Referring to FIG. 13 at "X-CBAR Outgate" time a representation of the address expression in section 404 of X-CBAR 403 is passed through switches 500 and 502 at "X-CBAR Outgate" time. Switch 500 passes the lowest order address bit and switches 502 pass all other bits of said expression. If QW latch 460 (FIG. 14) is not set at this time AND 570 operates to transfer the bit output of switch 500, via OR circuit 572 to bit bus line 574 which extends to In Buffer 50. If QW latch 460 is set AND 580 operates to pass the bit output of switch 500 in inverted form due to the action of NOT circuit 582. Consequently in association with reception of X-QW AND 580 becomes effective to transfer an inverted "lowest" order address bit from X-CBAR to array 50.

At "X-CBAR Outgate" time switches 504 and 506 become operative relative to respective data sections 406 and 408 of X-CBAR 403 (FIG. 13). If the request being transferred (outgated) is a Fetch, or if said request is a 1-wide Store, one or both AND circuits 476 and 480 (FIG. 14) will become activated to transfer respective command signals "0's to d1 output path" and/or "0's to d2 output path". These command signals operate respective switches 586 and 584 (FIG. 13) to transfer 0 signals with appropriate parity into respective continuation bus paths 588 and 590 (FIG. 13). These command signals also act through respective NOT circuits 592 and 594 (FIG. 13) to disable respective switches 596 and 598 (FIG. 13) which othewise provide continuity between respective CBAR sections 408 and 406 and respective continuation bus paths 588 and 590.

Consequently while the address part of a request is being transferred out of section 404 of X-CBAR 403 parity sustaining 0's are selectively inserted into data paths 588 and 590 when the associated request is a Fetch or 1-wide Store. While address and data parts of a 1-wide Store request are being transferred out of section 404 and one of the sections 406 or 408 of X-CBAR 403 into path 590 or path 588 (path 590 if D1 tag was received causing the data of the request to be entered into section 406; path 588 if D2 tag was received) parity sustaining 0's are inserted into the other path 588 and 590.

In this respect it should be noted that the timing of X-CBAR operations relative to reception of X-QW tag is such that invariably X-CBAR will be vacated (not full) prior to reception of X-QW. This means that a first part of a 4-wide request will have been transferred out of X-CBAR before reception of X-QW and a second part of the same request will be subsequently transferred with the lowest order address bit inverted. It also means that in each transfer the most recently received data of a Store type request (or, in the case of Fetch request, parity sustaining "zero" words) will be transferred into paths 588 and 590.

While the invention has been particularly shown and described with reference to a preferred embodiment thereof, it will be understood by those skilled in the art that various changes in form and detail may be made therein without departing from the spirit and scope of the invention.

What is claimed is:

1. In a data processing system, including multiple input/output channels arranged in plural groups of channels and an addressable storage facility shared by said channels, in combination:

plural channel group adapters associated with respective said groups of channels for transferring input and output storage access requests from the channels of the respective group to said facility;

a bus controller unit intermediate said group adapters and said storage facility for forwarding requests asynchronously from all of said adapters to said facility; said controller unit comprising buffer storage means having capacity reserved relative to each of said adapters for potentially enqueueing plural requests of each adapter simultaneously;

request busing interconnection means, intermediate each adapter and said bus controller unit, comprising a bus for transferring request information from the associated adapter to said bus controller unit; an Enable line controlled by said bus controller unit for enabling the associated adapter to transfer request signals to said bus whenever the capacity reserved in said buffer storage means relative to said adapter includes a vacant space for storing a request; and plural tag lines controlled by the associated adapter for enabling said bus controller unit to: (a) distinguish successive requests presented by the associated adapter; (b) distinguish between input and output requests; (c) orient plural data words of one input request in a selected order of spatial succession for storage in said facility, said spatial order being susceptible of differing from the time order of succession in which said words have been received from said bus; and (d) produce at least one implicit address from an explicit address accompanying a request, said implicit address designating a storage space in said facility contiguous to a space designated by said explicit address.

2. In a data processing system including multiple input/output channels and an addressable storage facility shared by said channels, in combination:

a first adapter unit associated with said channels for forwarding requests for input storage and output retrieval of data words from said channels to said facility; each said request for input storage of data words including a variable number of from 1 to m (m > 1) data words representing data to be stored and address information effectively designating locations of spaces in said facility for storage of said data words;

a second adapter unit intermediate said adapter and said facility for temporarily storing and forwarding said requests en route to said facility; and request busing interconnection means linking said first adapter to said second adapter for transfer of said requests; and interconnection means comprising a word bus, for transferring request information including said data words and address information to said second adapter one word at a time, and plural control lines, said control lines including plural data tag lines;

said first adapter including: means for distinguishing input requests associated with Read operations and Read Backward operations being conducted in associated channels originating said requests; and means controlled by said input request distinguishing means for activating individual said data tag lines in a selective order of succession in association with a succession of transfers of individual said data words of an input request to said word bus;

said second adapter including means responsive to said data tag line activations for orienting associated data words received from said bus in a selective spatial order of succession relative to said facility; whereby said data words are stored in said spatial order in a said storage space in said facility in accordance with said data tag line activations.

3. In a system according to claim 2, wherein a said designated space may have capacity to accommodate two data words and a said input request is susceptible of including two data words to be stored in said space; said combination being characterized in that:

said data tag lines consist of two lines activatable individually, in the association with transfers of individual said data words to said bus; said data tag lines being activatable by said activating means in a selective order of succession relative to the order of transfer of said two data words in response to operations of said distinguishing means; said means responsive to said data tag line activations, in said second adapter, being responsive to said tag activations to orient said transferred data words reversibly in respective first and second orders of spatial succession for storage in said two-word space.

4. In a data processing system including multiple input/output channels and an addressable storage facility shared by said channels, in combination:

a first adapter unit for forwarding requests for input storage and output retrieval, of various length series of data words, from said channels to said storage facility; each request including explicit address information effectively designating the location of an associated data word storage space in said facility;

a second adapter unit intermediate said first adapter unit and said facility for temporarily storing and forwarding said requests en route from said first adapter unit to said facility; and request busing interconnection means for linking said first adapter unit to said second adapter unit for transfers of said requests; said means comprising: a bus for transferring request information words including data words of said input requests and words containing said explicit address information; and plural control lines including a tap line for implicit address designation;

said first adapter unit including means for conditionally activating said implicit address tag line at a predetermined stage of the transfer handling of certain of said requests;

said second adapter unit including means responsive to said explicit address information of said certain requests in conjunction with associated activations of said implicit address tag line for producing a series of requests containing addresses designating a series of plural contiguous data word storage spaces in said facility including the space designated by said explicit address information.

5. In a system according to claim 4, wherein a single said request may require storage or retrieval of either two or four data words and said explicit address information is effective explicitly to designate the location of a storage space for two data words, said combination being characterized in that:
said means in said first adapter unit for conditionally activating said implicit address tag line is conditioned in association with each transfer of a request requiring storage or retrieval of four data words; and
said means in said second adapter unit responsive to said explicit address reacts to said explicit address and activation of said tag line to store and forward two requests relative to said facility; said two requests consisting of a first explicit request including said explicit address and a second implicit request including an implicit address, said implicit address derived from said explicit address by inversion of a low order bit in said explicit address.

6. In a data processing system including multiple input/ output channels, an addressable storage facility shared by said channels and adaptation facilities intermediate said channels and said storage facility for storing multiple requests originated by said channels and forwarding said requests to said storage facility, said requests including requests for input storage of data words and requests for output retrieval of data words, improved adaptation facilities comprising:
plural first adapter units and a single second adapter unit; said first units linking groups of said channels to said second unit; said second unit linking said groups to said storage facility; said first and second units each providing buffer storage of said requests; and
plural request busing interconnection means between respective said first units and said second unit; each said interconnection means including a bus and a plurality of control lines; said bus serving to carry request information word signals including address words and data words from said first adapter unit to said second adapter unit; said control lines serving to coordinate said first and second units for transfer handling of individual said requests; said control lines including an enable line activatable by said second unit for enabling said first unit to transfer request information word signals to said bus; said second unit being capable under predetermined conditions of maintaining said line in an activated condition continuously for an interval of time sufficient to permit plural requests to be transferred from said first unit to said second unit.

7. In a system combination according to claim 6:
said second adapter unit comprising: plural assembly registers (CBAR) associated with individual said first units for receiving said request information from said bus; and an addressable buffer storage array for receiving request information from said assembly registers; said second unit requiring a predetermined first space of time to empty all of said assembly registers into said buffer array when said array is accessible and said registers simultaneously contain requests eligible for transfer; and each said first adapter unit allowing at least a predetermined second space of time to elapse between transfers of successive requests to said bus; the magnitudes of said first and second time spaces having predetermined inter-relationship.

8. In a data processing system comprising multiple input/output channels, a storage facility shared by said channels, plural group adapters associated with respective discrete groups of said channels for receiving requests from said channels and forwarding said requests for presentation to said facility, and a channel bus controller for passing requests from said adapters to said facility; said requests including input requests for storage of data words in storage spaces of said facility designated by address information contained in the requests and output requests for retrieval of data words from storage spaces designated by address information in the requests, the method of communicating said requests from said adapters to said bus controller comprising:
communicating control signals from said bus controller to said adapters for enabling said adapters individually to transfer requests signals to said bus controller; said enabling control signals being furnished to respective adapters without prior solicitation by said adapters and being conditional only on the potential capability of said controller to handle additional requests from the respective adapters; and
communicating plural tag control signals selectively from each adapter to the bus controller, in association with communication of request information signals from said adapters to said bus controller, for enabling said bus controller to effectuate:
a. distinguishing of successive requests from each adapter;
b. distinguishing of individual input data words of said input requests;
c. arranging of individual said input data words in a predetermined order of spatial succession relative to the storage spaces designated by the respective requests; said order of spatial succession being susceptible of differing from the order of succession of said words in the communication of the associated request to said bus controller; and
d. constructing of additional implicit requests from certain of said communicated requests by modifying explicit address information in said certain requests to designate spaces contiguous to the spaces designated by said explicit requests.

9. In a data processing system comprising multiple input/output channels, a storage facility shared by said channels, an adapter associated with said channels, a bus controller unit associated with said facility and bus means linking said adapter to said controller for transferring requests for storage of input data words and retrieval of output data words from said channels to said facility; a method of communicating said input data words comprising:
transferring a series of plural said data words one at a time, from said adapter to said bus controller via said bus means, in association with address information effectively designating a plural-word space in said facility for storing said data words;
transferring a selected one of a plurality of data tag signals with each of said data words to effectively designate a selected word space portion of said plural-word space for storage of the associated data word; and arranging the order of succession of said transferred data tag signals to cause said associated data words to be stored in said plural-word space in an order of spatial succession susceptible of being different from the order of temporal succession of said words in said first transferring step.

10. In a system according to claim 9, wherein said requests for data word storage are transferred in association with Read and Read Backward operations of said channels, said arranging step of said method comprising:

arranging the order of succession of said data tag signals, in association with said Read Backward operations, to cause said data words to be stored in a reverse order of spatial succession relative to the order of transfer of said words to said interface.

11. In a data processing system comprising multiple input/output channels, a storage facility shared by said channels, an adapter associated with said channels for communicating requests for data word storage and retrieval to said facility, and interconnection means for linking said adapter to said facility, the method of communicating said requests relative to said interconnection means comprising:

communicating address information explicitly designating one storage space in said facility; and communicating a tag signal implicitly designating another storage space contiguous to said one space.

12. In a data processing system according to claim 10, wherein said one space designated by said address information is a doubleword space, said another space designated by said tag signal also constituting a doubleword space; said method including:

forming an address designating said other space in response to said communicated tag signal by inverting a bit in said communicated explicit address.

13. In a data processing system comprising plural sources of storage access requests, a storage facility shared by said sources, and means between said sources and facility for storing and forwarding said requests, a method of communicating said requests between said sources and said storing and forwarding means comprising:

presenting unsolicited enabling signals from said storing and forwarding means to said sources as a potentially continuous function of instantaneous storage capacity conditions in said storing and forwarding means;

conditionally transferring signals representing said requests from said sources to said storing and forwarding means without acknowledgement, conditioning each request transfer upon the presence of a said enabling signal; and allowing for a predetermined delay time to elapse at each source between transfers of successive requests; said delay time being associated with the aggregate time which is potentially required by the storing and forwarding means to accommodate requests presented simultaneously by all of said sources.

14. In a data processing system according to claim 13 wherein said storing and forwarding means comprises a shared buffer storage array for storing and forwarding all of said requests:

establishing said delay time as a predetermined function of the number of said sources multiplied by the time required to gain access to said array for storage of a request from one source.

* * * * *